United States Patent [19]

Kitamura et al.

[11] Patent Number: 5,066,630
[45] Date of Patent: Nov. 19, 1991

[54] METHOD FOR REMOVING NITROGEN-CONTAINING ORGANIC COMPOUNDS FROM CRYSTALLINE METALLOSILICATE

[75] Inventors: Masaru Kitamura; Hiroshi Ichihashi; Gohfu Suzukamo, all of Osaka, Japan

[73] Assignee: Sumitomo Chemical Company, Limited, Osaka, Japan

[21] Appl. No.: 537,432

[22] Filed: Jun. 13, 1990

[30] Foreign Application Priority Data

Jun. 30, 1989 [JP] Japan ................................ 1-171007

[51] Int. Cl.$^5$ ........................ B01J 37/08; B01J 29/04
[52] U.S. Cl. ...................................... 502/85; 423/328
[58] Field of Search ...................... 502/85; 423/328 T

[56] References Cited

U.S. PATENT DOCUMENTS 4,175,114  11/1979  Plank et al. ................ 423/328 T
4,335,020  6/1982   Chu et al. ......................... 502/85
4,431,621  2/1984   Taramasso et al. ............... 423/329

FOREIGN PATENT DOCUMENTS 1316385   5/1973   United Kingdom.
8911336  11/1989   World Int. Prop. O. ............ 502/85

*Primary Examiner*—Carl F. Dees
*Attorney, Agent, or Firm*—Darby & Darby

[57] ABSTRACT

Nitrogen-containing organic compounds are removed from crystalline metallosilicates containing the same by firing the crystalline metallosilicates in the presence of a gas containing molecular oxygen and additionally a lower alcohol represented by the formula (I):

$$R\text{—OH} \qquad (I)$$

wherein R represents an alkyl group of 1–4 carbon atoms.

4 Claims, No Drawings

METHOD FOR REMOVING NITROGEN-CONTAINING ORGANIC COMPOUNDS FROM CRYSTALLINE METALLOSILICATE

The present invention relates to a method for removing nitrogen-containing organic compounds from crystalline metallosilicates containing the same.

In general, crystalline metallosilicates are obtained by subjecting silicon compounds to hydrothermal synthesis in the presence of nitrogen-containing organic compounds such as primary amines, secondary amines, tertiary amines, cyclic amines, diamines and quaternary ammonium ions. The thus obtained crystalline metallosilicate contains nitrogen-containing organic compounds used in hydrothermal synthesis. Therefore, when the crystalline metallosilicate is used as catalysts, adsorbents or adsorption separators, the nitrogen-containing organic compounds trapped in the crystal have to be removed.

Hitherto, nitrogen-containing organic compounds have been removed by firing crystalline metallosilicates in the presence of gas containing molecular oxygen, for example, in the air, at a high temperature of higher than about 500° C. This method has the problem that the firing temperature is so high that crystal of the crystalline metallosilicate is partially ruptured.

Furthermore, firing in an atmosphere containing steam of ammonia at 260–538° C. is disclosed in British Patent No.1316385. This method still has the problems that crystal surface is ruptured or removal of nitrogen-containing organic compounds is not sufficient.

An object of the present invention is to provide a method for sufficient removal of nitrogen-containing organic compounds by firing crystalline metallosilicate in the presence of gas containing molecular oxygen.

Another object of the present invention is to provide a method according to which the firing crystalline metallosilicate in the presence of gas containing molecular oxygen is carried out under moderate temperature conditions.

That is, the present invention provides a method for removing nitrogen-containing organic compounds from crystalline metallosilicates by firing crystalline metallosilicates in the presence of gas containing molecular oxygen, in which a lower alcohol represented by the formula (I):

$$R-OH \qquad (I)$$

wherein R represents an alkyl group of 1–4 carbon atoms, is allowed to coexist in the firing atmosphere.

The present invention will be explained in detail.

The crystalline metallosilicates used in the present invention include those which contain a metallic element as a constituting component in crystal skeleton. Specific examples are those which contain at least one element selected from the group consisting of Ga, Fe, B, Zn, Cr, Be, Co, La, Ti, Zr, Hf, V, Ni, Sb, Bi, Cu, Nb, Ge, and Al as the metallic element.

Silicon/metal atomic ratio of these crystalline metallosilicates has no special limitation, but is usually 5 or more, preferably 20 or more.

The crystallline metallosilicates used in the method of the present invention further include crystalline silicates which contain no metal atom other than silicon, namely, those having a silicon/metal atomic ratio = ∞.

The crystalline metallosilicates are produced by known processes.

The nitrogen-containing organic compounds which are removed by the method of the present invention have no special limitation. As examples thereof, mention may be made of nitrogen compounds containing cations such as tetralkylammonium, trialkylammonium, dialkylammonium, monoalkylammonium, arylammonium, alkylarylammonium, and polyquaternary ammonium and nitrogen compounds such as primary amines, secondary amines, tertiary amines, alkylamines, arylamines, cyclic amines and diamines. More specifically, mention may be made of tetramethylammonium, tetraethylammonium, tetrapropylammonium, tetrabutylammonium, tripropylammonium, diethylammonium, butylammonium, phenylammonium, trimethylphenylammonium, trimethylbenzylammonium, N,N,N',N'-tetramethyltriethylenediammonium, propylamine, isopropylamine, dipropylamine, tripropylamine, diaminopentane, diaminododecane, aniline, monoethanolamine, triethanolamine, N-ethylpiperidine, morpholine, and ethylenediamine.

The gas containing molecular oxygen used in the present invention includes, for example, oxygen, air, gas enriched by oxygen, and air or oxygen diluted with inert gas.

The lower alcohol used in the present invention is represented by the formula (I):

$$R-OH \qquad (I)$$

(wherein R represents an alkyl group of 1–4 carbon atoms) and examples thereof are methanol, ethanol, n-propanol, iso-propanol, 1-butanol, 2-butanol, iso-butanol and tert-butanol. Mixtures of these lower alcohols may also be used.

Method for firing crystalline metallosilicates in a gas containing molecular oxygen in the presence of a lower alcohol is not critical.

One of the methods is that alcohol vapor is mixed with air and then crystalline metallosilicates may by treated therein under firing conditions. The metallosilicates may be subjected to this treatment in a fluidized state. Alternatively, the treatment is conducted in a fixed bed type reactor or the metallosilicates in the form of powders or pellets can be treated in a firing furnace.

An amount of lower alcohol which is allowed to coexist with gas containing molecular oxygen is not critical, but the explosive range should preferably be excluded for safety. Specifically, an amount of lower alcohol is more preferably less than the explosive lower limit. For example, in the case of methanol, an amount thereof is less than 6 volume%, more preferably 4 volume% or less based on air.

From a point of assurance of safety, lower alcohol may be diluted with inert gas such as nitrogen, carbon dioxide or argon. When lower alcohol is diluted with inert gas, the explosive range of composition of lower alcohol is narrowed and so lower alcohol of higher concentration may be allowed to coexist as compared with when it is not diluted.

When lower alcohol is allowed to coexist with gas containing molecular oxygen, firing temperature is usually lower than 500° C., more preferably 300°–470° C. Firing time has no special limitation and can be optionally chosen depending on an amount of the crystalline metallosilicates, an amount of the lower alcohol and firing temperature.

The method of the present invention is carried out by allowing a lower alcohol to coexist together with gas containing molecular oxygen and besides, can be carried out in combination with conventional methods. For example, (1) the crystalline metallosilicates are previously fired in the presence of gas containing molecular oxygen together with a lower alcohol and (2) thereafter, are further fired in the presence of gas containing molecular oxygen.

The steps (1)→(2) may be (2)→(1)

Firing temperature in the presence of gas containing molecular oxygen is usually lower than 500° C, more preferably 300°–470° C. Firing time is not critical but optionally chosen depending on an amount of the crystalline metallosilicates and firing temperature.

As explained in detail hereabove, according to the present invention, the objective nitrogen-containing organic compounds are removed under moderate temperature conditions as compared with conventional method and besides, crystalline metallosilicates are not ruptured. Therefore, industrial value of the present invention is very high.

The present invention is explained by the following nonlimiting examples.

REFERENCE EXAMPLE 1 (Preparation of Sample A)

1. In a 1.5 liter stainless steel autoclave were charged 100 g of tetraethyl orthosilicate ($Si(OC_2H_5)_4$. Al content: 10 ppm or less), 224.0 g of 10% aqueous tetra-n-propylammonium hydroxide solution and 214 g of ethanol and the mixture was vigorously stirred for 30 minutes. The mixed solution had a pH of 13. The autoclave was sealed and then dipped in an oil bath and hydrothermal synthesis was carried out for 48 hours under stirring at higher than 400 rpm and keeping internal temperature at 105° C., during which pressure in the autoclave reached 2–3 kg/cm². At termination of the hydrothermal synthesis, pH was 11.8. A white solid product was collected by filtration and continuously washed with distilled water until pH of filtrate reached about 7. The white solid was dried to obtain 27 g of powdery white crystals. The crystals were identified to be pentasil type zeolite by powder X-ray diffractometry. This is referred to as Sample A.

REFERENCE EXAMPLE 2 (Preparation of Sample B)

1. In a 1.5 liter stainless steel autoclave were charged 104.2 g of tetraethyl orthosilicate ($Si(OC_2H_5)_4$), 232.9 g of 10% aqueous tetra-n-propylammonium hydroxide solution, 62.3 g of ethanol and 50.4 g of water and the mixture was vigorously stirred. The mixed solution had a pH of 12.8. The autoclave was sealed and then dipped in an oil bath and hydrothermal synthesis was carried out for 48 hours under stirring at higher than 400 rpm and keeping internal temperature at 105° C., during which pressure in the autoclave reached 2–3 kg/cm². At termination of the hydrothermal synthesis, pH was 11.8. A white solid product was collected by filtration and washed in the same manner as in Reference Example 1 to obtain powdery white crystals. The crystals were identified to be pentasil type zeolite by powder X-ray diffractometry. This is referred to as Sample B.

REFERENCE EXAMPLE 3 (Preparation of Sample C)

First, raw material solutions having the following compositions were prepared.

| Solution A: | Distilled water | 433.4 g |
|---|---|---|
| | Sulfuric acid | 44.8 g |
| | $Al_2(SO_4)_3 \cdot 18H_2O$ | 7.1 g |
| | *$(n-Pr)_4NBr$ | 54.3 g |
| Solution B: | Distilled water | 320.0 g |
| | Sodium silicate | 452.8 g |
| Solution C: | Distilled water | 753.5 g |
| | Sodium chloride | 189 g |

*tetra-normal propyl-ammonium bromide

The solution A and the solution B were simultaneously added dropwise to the solution C and they were mixed under vigorous stirring. At termination of the mixing, pH was 9.5. The mixture was charged in a 1.5 liter stainless steel autoclave and hydrothermal synthesis was carried out at 160° C. for 20 hours under stirring at 400 rpm or higher. After cooling, the product was filtrated. Washing with about 7 liters of distilled water and the filtration were sufficiently repeated until $Cl^-$ ion was not detected. Furthermore, the resulting white solid was dried at 120° C. for 16 hours to obtain 117 g of white powdery crystals. The crystals were identified to be pentasil type zeolite by powder X-ray diffractometry. Further, atomic absorption spectrometric analysis of the crystals gave an Si/Al atomic ratio of 42.5. This is referred to as Sample C.

REFERENCE EXAMPLE 4 (Preparation of Sample D)

First, raw material solutions having the following compositions were prepared.

| Solution A: | Distilled water | 150.0 g |
|---|---|---|
| | $(n-Pr)_4NBr$ | 51.4 g |
| | Colloidal silica (SI-30) | 250 g |
| | $Al_2(SO_4)_3 \cdot 18H_2O$ | 1.73 g |
| Solution B: | Distilled water | 60.0 g |
| | Sodium hydroxide | 7.95 g |

The solution B was added dropwise to the solution A and they were mixed. The mixture was charged in a 1 liter stainless steel autoclave and hydrothermal synthesis was carried out at 160° C. for 120 hours under stirring. After cooling, the product was filtrated and continuously washed with distilled water until pH of the filtrate reached about 7.

The resulting white solid was dried at 120° C. for 16 hours to obtain powdery crystals. The crystals were identified to be pentasil type zeolite by powder X-ray diffractometry. Elemental analysis of the crystals by atomic absorption spectrometry gave an Si/Al atomic ratio of 204. This is referred to as Sample D.

REFERENCE EXAMPLE 5 (Preparation of Sample E)

In a 1.5 liter stainless steel autoclave were charged 100 g of tetraethyl orthosilicate ($Si(OC_2H_5)_4$), 99.7 g of 25% aqueous tetra-n-propylammonium hydroxide solution and 60 g of ethanol and the content was well stirred. To this mixed solution was added 172 g of previously prepared aqueous aluminum sulfate solution ($Al_2(SO_4)_3 \cdot 18H_2O$ 125 mg/water 172 g) and the mixture was vigorously stirred for 30 minutes. The mixed solution had a pH of 12.6. The autoclave was sealed and then was dipped in an oil bath and hydrothermal synthesis was carried out for 113 hours under stirring at 400 rpm or higher at internal temperature of 155° C. At termination of the hydrothermal synthesis, pH was 12.2. The resulting white solid product was collected by filtration and was continuously washed with distilled water until pH of the filtrate reached about 7. The white solid was dried to obtain 32 g of powdery white crystals. The crystals were identified to be pentasil type zeolite by powder X-ray diffractometry. Elemental analysis of the crystals by atomic absorption spectrometry gave an Si/Al atomic ratio of 1160. This is referred to as Sample E.

REFERENCE EXAMPLE 6 (Preparation of Sample F)

First, raw material solutions having the following compositions were prepared.

| Solution A: | Distilled water | 150.0 g |
| | (n-Pr)$_4$NBr | 34 g |
| | Ga(NO$_3$)$_3$.9H$_2$O | 0.97 g |
| Solution B: | Fumed silica | 70 g |
| | Distilled water | 600.0 g |
| Solution C: | Distilled water | 100.0 g |
| | Sodium hydroxide | 7.4 g |

The solution A and the solution C were simultaneously added dropwise to the solution B under vigorous sirring and they were mixed. After completion of the mixing, the mixture had a pH of 12.8. The mixture was charged in a 1.5 liter stainless steel autoclave and hydrothermal synthesis was carried out at 190° C. for 48 hours under stirring at 350 rpm or higher The resulting white solid product was collected by filtration and washed in the same manner as in Reference Example 1 to obtain powdery white crystals. The crystals were analyzed by powder X-ray diffractometry and as a result, they were identified to be gallium silicate having a structure similar to that of pentasil type zeolite. Elemental analysis of the crystals by atomic absorption spectrometry gave an Si/Ga atomic ratio of 450. This is referred to as Sample F.

REFERENCE EXAMPLE 7 (Preparation of Sample G)

In a 1.5 liter stainless steel autoclave were charged 45.0 g of "Aerosil" (trade name, high purity amorphous silica), 45.73 g of tetra-n-propylammonium bromide, 10.8 g of sodium hydroxide and 375.81 g of distilled water and the autoclave was sealed and then, the content was vigorously stirred at 20° C. for 120 hours. The mixed solution had a pH of 12.8. Thereafter, hydrothermal synthesis was carried out for 96 hours at internal temperature of 105° C. under stirring at 400 rpm or higher. The resulting white solid product was collected by filtration and then washed continuously with distilled water until pH of the filtrate reached about 7. The white solid was dried. The resulting crystals were identified to be pentasil type zeolite by powder X-ray diffractometry. This is referred to as Sample G.

EXAMPLE 1

Three gram (5 ml) of the sample A was packed in a silica glass reaction tube having an inner diameter of 1 cm and was fired for 4 hours at 430° C. with feeding 0.15 g/hr of methanol and 2.5 1/hr of air.

After completion of the firing, nitrogen and carbon contained in the sample were analyzed by a full-automatic high-sensitivity N.C analyzing instrument of oxygen circulating combustion type to find that nitrogen content was 0% and carbon content was 0.052%.

Contents of nitrogen and carbon in the sample before fired were analyzed by the same method to find that nitrogen content was 0.938% and carbon content was 9.476%.

COMPARATIVE EXAMPLE 1

Three gram of the sample A was packed in the same manner as in Example 1 and was fired for 4 hours at 430° C. with feeding only 2.5 1/hr of air.

After completion of the firing, contents of nitrogen and carbon in the sample were analyzed in the same manner as in Example 1 to find that nitrogen content was 0.067% and carbon content was 0.397%.

EXAMPLES 2-5

Three grams each of the samples C-F was packed in the same manner as in Example 1 and fired for 4 hours at 430° C. with feeding 0.15 g/hr of methanol and 2.5 1/hr of air.

After completion of the firing, nitrogen and carbon contents in each sample were analyzed in the same manner as in Example 1 and the results are shown in Table 1.

For reference, results of analysis on samples before fired are also shown in Table 1.

TABLE 1

| | | After firing | | Before firing | |
| | | Nitrogen content (%) | Carbon content (%) | Nitrogen content (%) | Carbon content (%) |
| Example | Sample | | | | |
| --- | --- | --- | --- | --- | --- |
| 2 | C | 0.016 | 0.110 | 0.693 | 7.017 |
| 3 | D | 0 | 0.101 | 0.803 | 8.024 |
| 4 | E | 0 | 0.097 | 0.885 | 8.865 |
| 5 | F | 0 | 0.098 | 0.872 | 8.714 |

COMPARATIVE EXAMPLES 2-6

Three gram each of the samples B-F was packed in the same manner as in Example 1 and fired for 4 hours with feeding only 2.5 1/hr of air at 430° C.

After completion of the firing, nitrogen and carbon contents in each sample were analyzed in the same manner as in Example 1 and the results are shown in Table 2.

Nitrogen and carbon contents in the sample B before fired were analyzed in the same manner as in Example 1 to find that nitrogen content was 0.952% and carbon content was 9.498%.

TABLE 2

| Comparative Example | Sample | Nitrogen content (%) | Carbon content (%) |
| --- | --- | --- | --- |
| 2 | B | 0.129 | 0.646 |
| 3 | C | 0.045 | 0.197 |
| 4 | D | 0.001 | 0.018 |
| 5 | E | 0.007 | 0.054 |
| 6 | F | 0.004 | 0.033 |

EXAMPLE 6

Three gram of Sample B was packed in the same manner as in Example 1 and was fired for 4 hours with feeding 0.15 g/hr of methanol and 2.5 1/hr of air at 30° C. Furthermore, feeding of methanol was discontinued and firing was carried out for 2 hours with feeding only 2.5 1/hr of air.

After completion of the firing, nitrogen content and carbon content in the sample were measured in the same manner as in Example 1 to give nitrogen content of 0.026% and carbon content of 0.136%.

EXAMPLE 7

Three gram of the sample G was packed in the same manner as in Example 1 and fired for 4 hours with feeding 0.15 g/hr of methanol and 2.5 1/hr of air at 30° C.

After completion of the firing, nitrogen content and carbon content in the sample were measured in the same manner as in Example 1 to find that nitrogen content was 0% and carbon content was 0.226%.

Nitrogen content and carbon content in the sample before fired were measured in the same manner as in Example 1 to obtain nitrogen content of 0.797% and carbon content of 8.248%.

EXAMPLE 8

Three gram of the sample G was packed in the same manner as in Example 1 and fired for 4 hours with feeding 0.15 g/hr of methanol and 2.5 1/hr of air at 430° C. Feeding of methanol was discontinued and further firing was carried out for 2 hours with feeding only 2.5 1/hr of air.

After completion of the firing, nitrogen content and carbon content in the sample were measured in the same manner as in Example 1 to obtain nitrogen content of 0% and carbon content of 0.118%.

EXAMPLE 9

In order to confirm reproducibility of preparation of sample and removal of nitrogen-containing organic compound, a sample was prepared again by the same method as for preparation of the sample A in Reference Example 1 (The resulting sample is hereinafter referred to as "Sample A*".).

Three grams (5 ml) of the sample A* was packed in the same manner as in Example 1 and was fired for 4 hours with feeding 0.15 g/hr of methanol and 2.5 1/hr of air at 430° C.

After completion of the firing, nitrogen content and carbon content in the sample were measured in the same manner as in Example 1 to obtain nitrogen content of 0% and carbon content of 0.095%.

Nitrogen content and carbon content in the Sample A* before fired were measured in the same manner as in Example 1 to obtain nitrogen content of 0.847% and carbon content of 8.878%.

EXAMPLE 10

Three gram of the sample A* was packed in the same manner as in Example 1 and fired for 4 hours with feeding 0.15 g/hr of methanol and 2.5 1/hr of air at 430° C. Feeding of methanol was discontinued and further firing was carried out for 2 hours with feeding only 2.5 1/hr of air.

After completion of the firing, nitrogen content and carbon content in the sample were measured in the same manner as in Example 1 to obtain nitrogen content of 0% and carbon content of 0.034%.

EXAMPLE 11

Three grams of the sample A* was packed in the same manner as in Example 1 and fired for 4 hours with feeding 0.08 g/hr of ethanol and 2.5 1/hr of air at 430° C.

After completion of the firing, nitrogen content and carbon content in the sample were measured in the same manner as in Example 1 to obtain nitrogen content of 0% and carbon content of 0.024%.

EXAMPLE 12

Three grams of the sample A* was packed in the same manner as in Example 1 and was fired for 4 hours with feeding 0.19 g/hr of 1-butanol and 2.5 1/hr of air at 430° C.

After completion of the firing, nitrogen content and carbon content in the sample were measured in the same manner as in Example 1 to obtain nitrogen content of 0% and carbon content of 0.023%.

We claim:

1. A method for removing nitrogen-containing organic compounds from crystalline metallosilicates which comprises firing the crystalline metallosilicates in the presence of a molecular oxygen-containing gas and a lower alcohol represented by the formula (I)

$$R-OH \qquad (I)$$

wherein R represents an alkyl group of 1-4 carbon atoms.

2. The method according to claim 1, wherein the lower alcohol is at least member selected from the group consisting of methanol, ethanol, n-propanol, iso-propanol, 1-butanol, 2-butanol, iso-butanol and tert-butanol.

3. The method according to claim 1, wherein the lower alcohol is present in an amount lower than an explosive lower limit.

4. The method according to claim 1, wherein the metallosilicates have an Si/metal atomic ratio of 5 or more.

* * * * *